UNITED STATES PATENT OFFICE.

HEINRICH RICHARD KNOCH, OF CHEMNITZ, GERMANY.

ARTIFICIAL BUILDING-BLOCK.

SPECIFICATION forming part of Letters Patent No. 551,588, dated December 17, 1895.

Application filed February 27, 1892. Serial No. 423,067. (No specimens.)

*To all whom it may concern:*

Be it known that I, HEINRICH RICHARD KNOCH, of Chemnitz, in the Kingdom of Saxony, Germany, have invented a new and useful Improvement in Artificial Building-Blocks, of which the following is a specification.

This invention relates to an improved artificial building-block which is a poor conductor of heat, is waterproof and light.

To produce my improved artificial building-block paper-pulp from rags, wood, straw or other vegetable fiber or waste is converted by a mechanical stirrer into a hot liquid mass. Fifty parts of the pulp thus treated are mixed in a beater with twelve parts of broken peanut-shells, (*Arachis hypogœa.*) The mixing operation is effected under a high heat, so that a thick mass is obtained. Out of this mass the artificial building-blocks are formed in suitable sizes, and are dried at a temperature of 60° to 100° centigrade. The product is very light, (having a specific gravity of 0.2° to 0.24°,) tough, and elastic, is a poor conductor of heat and is not destroyed by water.

In order to increase the porosity and the insulating properties of the product, I add two to three parts of gum-tragacanth to the pulp. I also add two to five parts of dissolved caustic soda or a similar solution to render the stone incombustible.

What I claim is—

A composition for artificial building-blocks consisting of paper pulp, pea-nut shells, gum tragacanth and caustic soda, substantially as specified.

In testimony whereof I have signed my name to this specification in the presence of two subscribing witnesses.

HEINRICH RICHARD KNOCH.

Witnesses:
 MAX MATTHÄI,
 CARL BORNGRAEBER.